Nov. 21, 1950    R. G. LE TOURNEAU    2,531,062
VOLTAGE REGULATING SYSTEM
Filed April 9, 1948
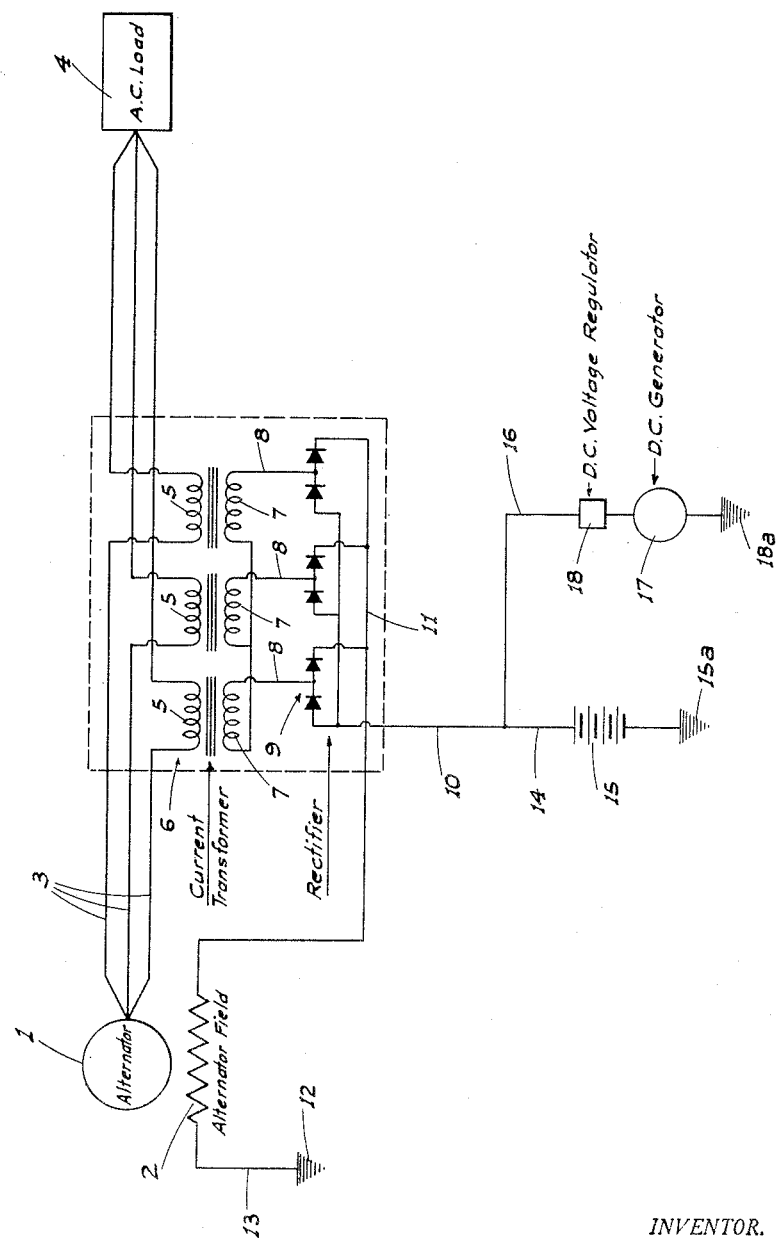
INVENTOR.
R. G. LeTourneau
BY
[signature]
ATTYS Patented Nov. 21, 1950

2,531,062

UNITED STATES PATENT OFFICE 2,531,062

VOLTAGE REGULATING SYSTEM

Robert G. Le Tourneau, Longview, Tex., assignor to R. G. Le Tourneau, Inc., Stockton, Calif., a corporation of California Application April 9, 1948, Serial No. 19,991

2 Claims. (Cl. 322—27)

This invention is directed to a voltage regulating system for an A. C. alternator or generator; the system being especially adapted, but not limited, for use in connection with tractor-propelled implements wherein an A. C. generator on and driven by the tractor supplies electrical energy for an electric actuating motor on the implement.

It is an object of the present invention to provide a voltage regulating system, as above, which is responsive to the load imposed on the generator, to automatically supply a proportionate exciter current to said generator. In this manner alternator regulation is accomplished effectively, and overloading is prevented.

The present invention represents a modification of the voltage regulator shown in copending application, Serial No. 727,805, filed February 11, 1947, now Patent 2,482,538, issued September 20, 1949.

As in said copending application, it is another object of the invention to provide a voltage (exciter current) regulating system for A. C. generators, which comprises a current transformer having its primary interposed in series in the load circuit between the A. C. generator and the load; the potential of such transformer as induced— in proportion to the load—in the secondary of the transformer being carried through an A. C.-D. C. rectifier and then fed as a D. C. exciter current to the field of the A. C. generator.

In the embodiment of said copending application the initial excitor current for the generator was supplied by a battery circuit, or a D. C. generator circuit, connected in parallel with respect to the A. C.-D. C. rectifier; the arrangement being such that said battery circuit, or D. C. generator circuit, dropped out when the voltage thereof was exceeded by the voltage of the rectifier. For very heavy loads this was essential, as the battery circuit, or D. C. generator circuit (as on a tractor) was able to supply only a negligible part of the large potential demanded.

It has been determined, however, that for lesser loads it is not necessary to drop out the battery circuit, or D. C. generator circuit, and that by maintaining them in series with the rectifier output, a beneficial additive effect is accomplished, reducing the drain which the regulator otherwise places on the output of the A. C. generator. Further, the system is simplified by the elimination of the blocking rectifier previously employed, and smaller equipment can be used throughout.

The use of a three-phase transformer and a three-phase rectifier as shown will permit the desired regulation to be obtained to supply an additional load placed on any phase of the three-phase load circuit.

A further object of the invention is to provide a simple and practical voltage regulating system for an A. C. generator, and a system which will be exceedingly effective for the purpose for which is it designed.

These objects are accomplished by means of such structure and relative arrangement of parts as will fully appear by a perusal of the following specification and claims.

The figure of the drawing is a diagrammatic view of the circuit of the voltage regulating system.

Referring now more particularly to the characters of reference on the drawings, the circuit which is here shown to illustrate the system includes an A. C. alternator or generator, indicated at 1, which generator includes an alternator field 2.

The load circuit is three-phase and is numbered 3; such load circuit leading to connection with a source of A. C. load, indicated diagrammatically at 4.

When the described voltage regulating system is employed on a tractor-propelled implement, the A. C. generator 1 is mounted on the tractor and driven by the tractor engine, thus being subject to acceleration and deceleration with the latter. In such an installation the A. C. load 4 would be, for example, an electric motor on the implement arranged in actuating relation to a movable part of the latter.

The load circuit 3 has the corresponding primary coils 5, of a current transformer 6, interposed in series therein. The secondary coils of such current transformer 6 are indicated at 7.

The output leads 8 of the secondary coils 7 extend to, and connect with, intermediate A. C. input terminals a rectifier 9, preferably of dry plate type; one end terminal of the rectifier being connected to a D. C. input lead 10. The other end terminal of the rectifier 9 connects, by a D. C. input lead 11, to one terminal of the alternator field 2 of the A. C. generator 1; the opposite terminal of said field 2 being grounded, as at 12, by a lead 13.

A battery circuit 14, including a battery 15, is connected at one end to lead 10 and grounded at the other end, as at 15a. Similarly, a D. C. generator circuit 16, including a D. C. generator 17 and a D. C. voltage regulator 18, is connected at one end to the lead 10 and grounded at the other end as at 18a. The circuits 14 and 16 are thus connected in parallel relation to each other but are each in series with the rectifier 9. The battery circuit 14, or the D. C. generator circuit 16, provide the initial exciter current, which is fed through lead 11, for the A. C. generator 1. In a tractor propelled implement the battery circuit and the generator circuit could be the conventional ones included in the tractor.

Thus, under no load conditions the open circuit voltage of the A. C. generator is controlled to the proper amount by field excitation supplied by any one of the usual means, such as the described battery circuit 14 or generator circuit 16.

Upon a load being imposed on the circuit 3, the load current passing through the series-connected primary coils 5 of the current transformer 6 induces a potential in the secondary coils 7 in direct proportion to the A. C. load 4.

This potential as induced in such secondary coils 7 is fed directly through the rectifier 9, and from said rectifier delivers to the lead 11 and thence to the field 2. The battery circuit 14, or the D. C. generator circuit 16, continue to furnish excitation current as an additive value, by reason of the series connection of said circuits.

With the described voltage regulating system, the exciter current delivered to the field 2 is automatically and correctly maintained, regardless of variation in the A. C. load 4, or speed fluctuation of the A. C. generator 1; this being accomplished, in short, by excitation of the field 2 by a rectified current, induced from the load circuit of the A. C. generator, in proportion to the load imposed thereon, and supplemented by the continuing exciter current delivered by the battery circuit 14, or D. C. generator circuit 16.

From the foregoing description it will be seen that there has been produced such a voltage regulating system as substantially fulfills the objects of the invention as set forth herein.

While this specification sets forth in detail the present and preferred construction of the voltage regulating system, still in practice such deviations from such detail may be resorted to as do not form a departure from the spirit of the invention, as defined in the appended claims.

Having thus described the invention, the following is claimed as new and useful, and upon which Letters Patent are desired:

1. In a regulating system of the character described, an alternating current generator having a voltage generating winding, with an associated field winding, a pair of serially connected rectifiers arranged to pass current in the same direction simultaneously, a battery, said battery, field winding and rectifiers being connected in a serial circuit whereby said battery causes a current to flow through said rectifiers and said field winding, a current transformer, the primary winding of said current transformer being serially connected with said generating winding whereby the generator load current flows through said primary winding, the junction point of said pair of serially connected rectifiers being connected to one terminal of the secondary winding of said transformer, the other terminal of said secondary winding being connected to a point in said serial circuit.

2. In a regulating system of the character described, an alternating current generator having a voltage generating winding with an associated field winding, a current transformer having its primary winding serially connected with said generating winding whereby the load current for said generator flows through said primary winding, a first rectifier, a second rectifier, serially connected with said first rectifier, a battery, said battery and field winding being serially connected with respect to each other and also with respect to said first and second rectifiers whereby said battery causes a current to flow through said rectifiers and said field winding, the secondary winding of said current transformer having one of its terminals connected to the junction point of said first and second rectifiers, said rectifiers being arranged to permit current to pass therethrough in the same direction simultaneously, the other terminal of said secondary winding being connected to one terminal of the serial circuit formed by said battery and field winding.

ROBERT G. LE TOURNEAU.

REFERENCES CITED

The following references are of record in the file of this patent:

UNITED STATES PATENTS

| Number | Name | Date |
| --- | --- | --- |
| 787,027 | Dobrowolsky | Apr. 11, 1905 |
| 2,088,617 | Sola | Aug. 3, 1937 |
| 2,236,880 | Perry | Apr. 1, 1941 |